United States Patent [19]

Kirk

[11] Patent Number: 5,178,577
[45] Date of Patent: Jan. 12, 1993

[54] SHELLFISH SHUCKING MACHINE

[76] Inventor: Nathan A. Kirk, 4726 Peacock Dr., Pensacola, Fla. 32504

[21] Appl. No.: 759,441

[22] Filed: Sep. 13, 1991

[51] Int. Cl.⁵ .............................................. A22C 29/04
[52] U.S. Cl. ........................................ 452/13; 452/16
[58] Field of Search .............................. 452/13, 16, 17; 30/120.1, 120.5

[56] References Cited

U.S. PATENT DOCUMENTS 1,683,113  9/1928  Whelan ................................. 452/16
2,391,739  12/1945  Ragupos ............................... 452/13
2,808,613  10/1957  Palmere ............................... 452/16
4,348,788  9/1982  Jurcak .................................. 452/16

Primary Examiner—Willis Little
Attorney, Agent, or Firm—John K. Donaghy

[57] ABSTRACT

An shellfish shucking machine comprising a housing; means on the housing for supporting oyster shells; a tool on the housing for opening oyster shells; and means for operating the tool whereby the tool performs a cutting of the oyster shell and then a splitting of the oyster shell.

6 Claims, 4 Drawing Sheets

SHELLFISH SHUCKING MACHINE

BACKGROUND OF THE INVENTION

1. Field of the Invention

This invention pertains to a shellfish opening machine and specifically to a pneumatically operated oyster shucking machine.

2. Background of the Prior Art

Oyster shucking has been done with a manually operated hand held knife. The number of oysters opened by this method is very limited.

More recently, mechanical spring operated devices have been used which overcomes the disadvantages of the traditional hand held knife and thus more shellfish could be opened. These devices are still cumbersome and could be dangerous to operate.

New technology has seen the introduction of power operated machines. These machines are capable of opening shellfish and particularly oysters at a rapid rate making them more desirable than traditional knives and the newer spring operated devices.

Representative of the prior art devices are the following list of patents, copies are furnished herewith for the record.

U.S. Pat. No. 4,617,734 is a hand held oyster shell opener having projections which define a jaw for leverage opening an oyster shell. U.S. Pat. No. 3,654,666 is an oyster shell opening device having a movable anvil and a pneumatically operated movable piston having a bit to open the oyster shells. U.S. Pat. No. 4,796,333 shows a manually operated spring device for shellfish shucking. U.S. Pat. No. 3,605,180 discloses a power operated device for shucking oysters and U.S. Pat. No. 4,143,444 shows a power driven device having force applying means for engaging one half shell of an oyster.

These devices have certain merit but nonetheless have disadvantages in their complication of parts and operation, and high cost.

SUMMARY OF THE INVENTION

There is a need for a simple and efficient power operated machine which will permit rapid opening of many shellfish and particularly oysters without tearing the meat or leaving shell pieces in the meat. This aspect of the invention in providing undamaged meat is a factor in determining the grade or quality of the meat, which, for processing distributors, is very important.

It is therefore one object of this invention to provide an oyster shell opening machine having a tool which will break apart clusters of oysters with a great push force.

It is another object of this invention to provide an oyster shell opening machine having a unique knife on the tool which cuts one end of the oyster thereby exposing more visibly an eye in the shell.

Yet another object of this invention is to provide an oyster opening machine having a pneumatically articulated arm on which a knife is caused to move and sever an end of the oyster called an eye and a wedge with a blade opens the shell horizontally. The eye is placed on the wedge and then the oyster is directed toward the appropriate groove and the shell is forced into the groove horizontally. The ability to effect a clean horizontal opening is important to retain the liquid in the half shells for serving in restaurants.

And still another object of this invention is to provide such machine having a cabinet for containing the pneumatically operated parts of the machine and a tray portion for receiving the oyster meat and liquid.

These and other objects of this invention will become apparent to those skilled in the art to which the invention pertains from a reading of the following specification when taken with the annexed drawings.

DESCRIPTION OF THE PREFERRED EMBODIMENT OF THE INVENTION

Figure 1:
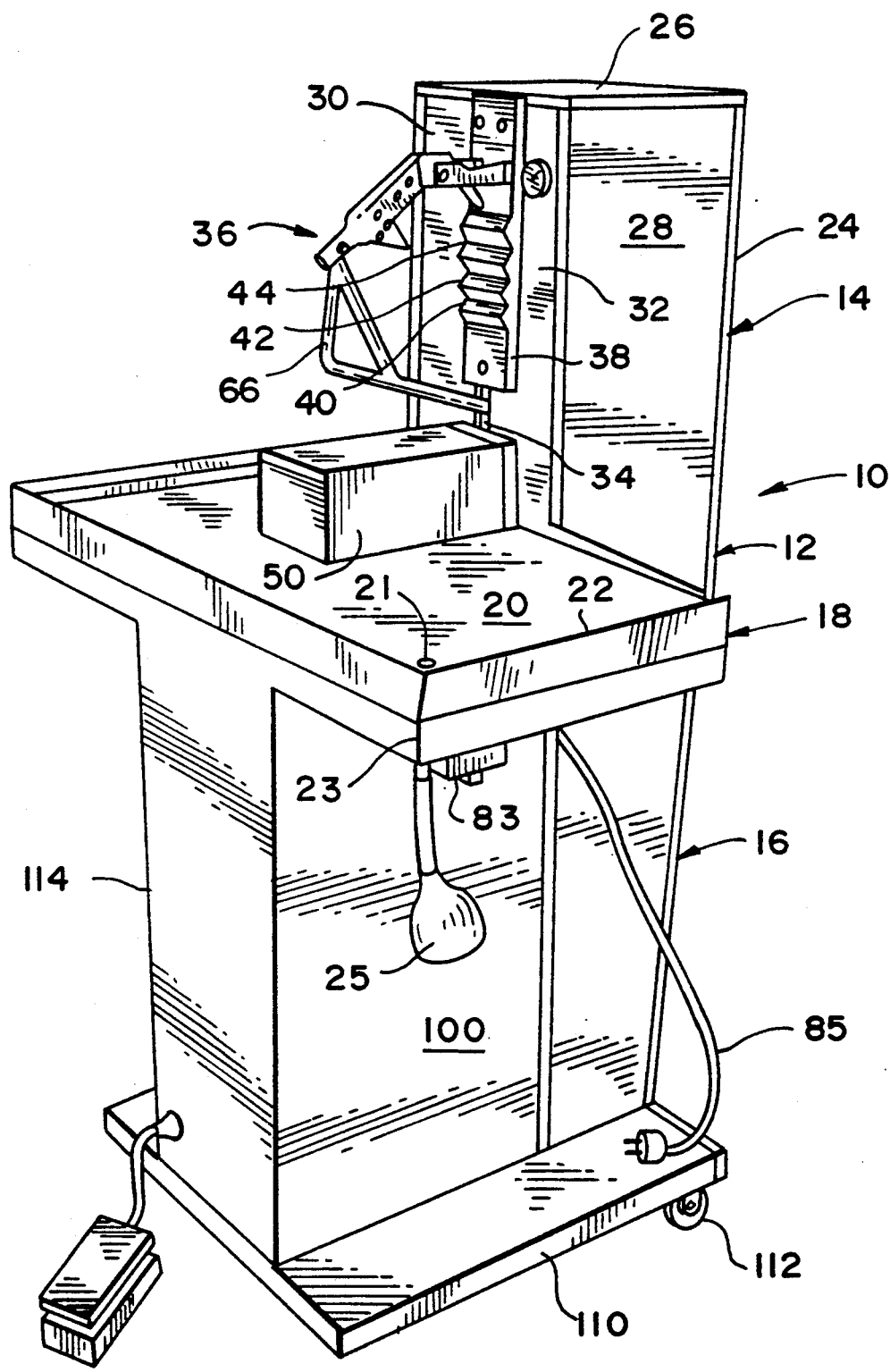
FIG. 1 is a perspective view of the machine showing a cabinet containing the parts, a table for receiving oyster meat and liquid, and an articulated arm for opening oyster shells.

Referring now in more detail to the drawings, FIG. 1 shows an oyster shucking machine 10 comprising a cabinet 12 having an upper portion 14, a lower portion 16 and a mid portion 18 which may be a tray or table having a top 20 and a raised lip 22 for holding oyster meat and the liquid from the oyster shells. The tray 20 has an opening 21 and a passage 23 for conveying the liquid to a container 25 positioned beneath the tray.

The top portion 14 comprises a back wall 24, top wall 26, side walls 28 and 30 forming a top cabinet having a front wall 32.

The front wall 32 has an opening 34 into the interior 29 of the top cabinet for the passage of an arm 62 of an articulating member 36 to be more fully discussed below.

Positioned on the front wall 32 is an elongated base plate 38 having a series of longitudinal grooves or depressions 40, 42, 44 for supporting oyster shells of various sizes during the opening process. The bottom groove 40 will support large shells, the middle groove 42 will support middle-sized shells, while the top groove 44 will support small shells. The close arrangement of these grooves and their proximity to a shell splitting tool facilitates rapid processing of a large number of different size oysters.

Figure 2:
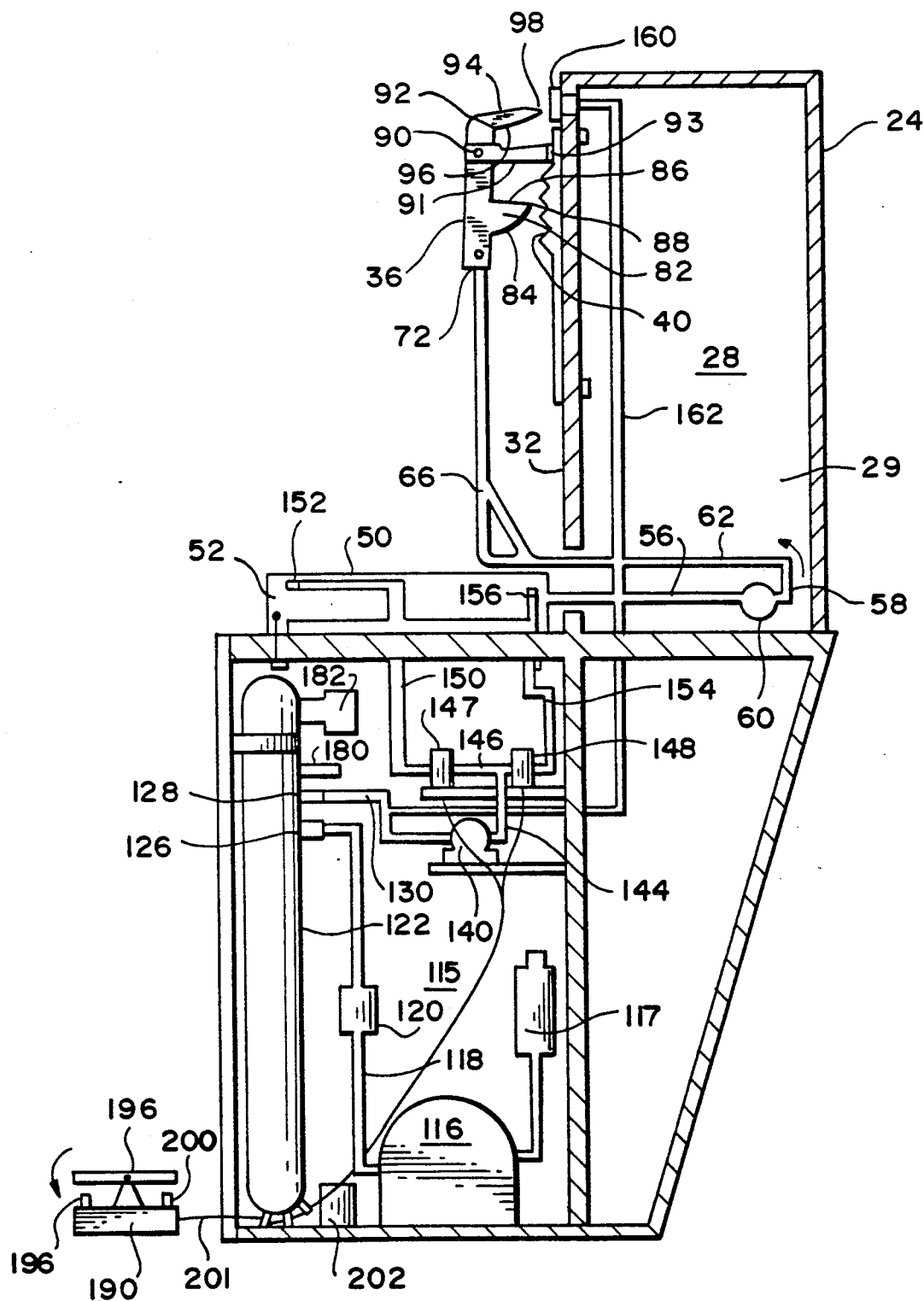
FIG. 2 is a side view in section of the cabinet showing the internal parts of the machine.

The tray 20 has a housing 50 thereon for a two-way air cylinder 52, FIG. 2. The air cylinder 52 has a reciprocating piston 56 which is pivotally attached to a connecting arm 58 of a rod clevis 60. The rod 58 is u-shaped at its end and has a horizontal rod portion 62 and a vertical member 66. The upper end of the member 66 is connected at pivot point 72 to the bottom end of the articulating arm 36.

Figure 3:
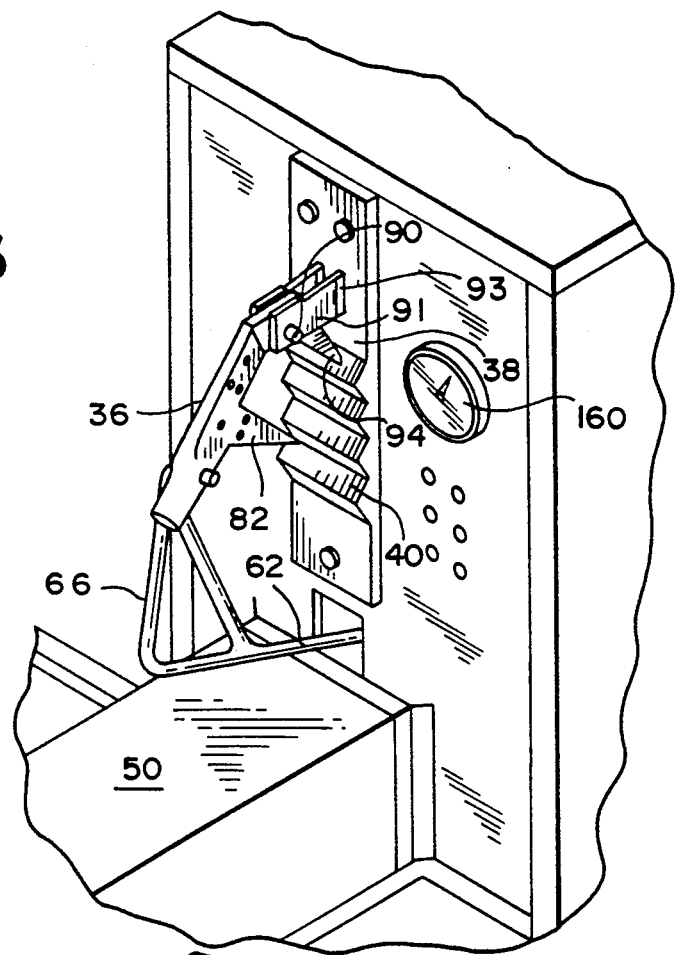
FIG. 3 is a close-up perspective view of the articulating arm with cutter knife and wedge for opening oyster shells.
Figure 4:
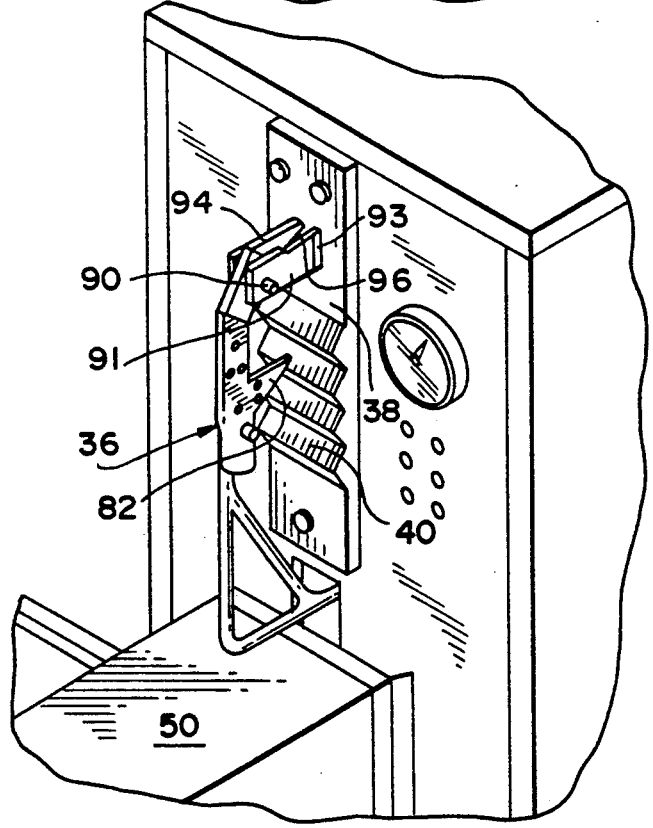
FIG. 4 is another close-up perspective view of the articulating arm with a wedge portion adjacent an oyster shell supporting plate.
Figure 5:
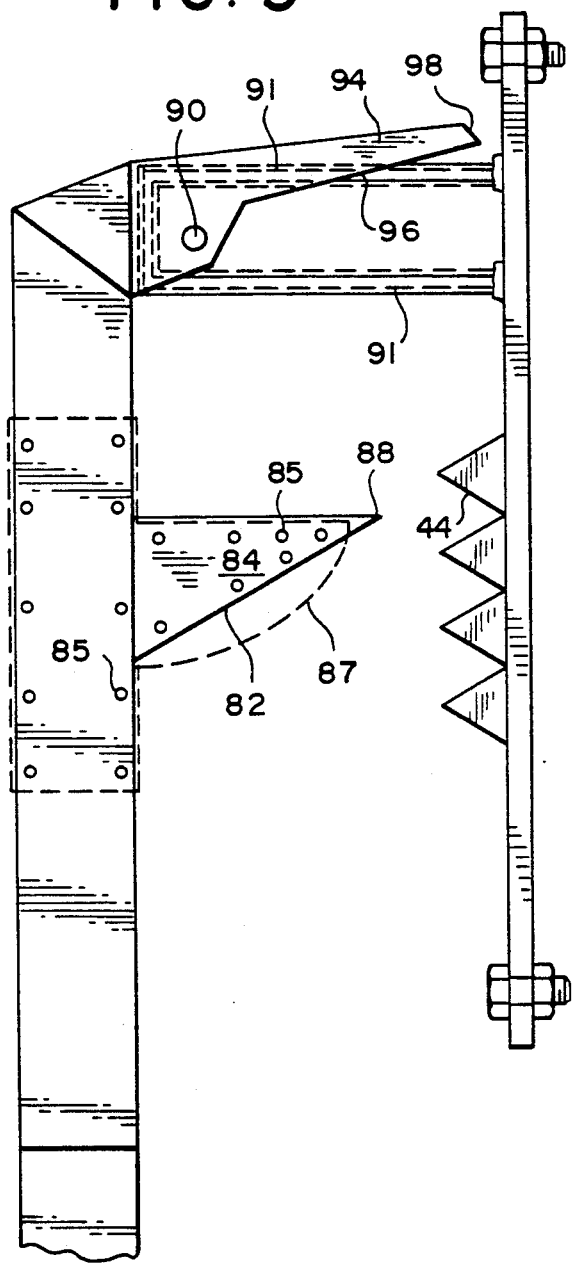
FIG. 5 is a side view of the articulating arm with cutters and supporting brackets.
Figure 6:
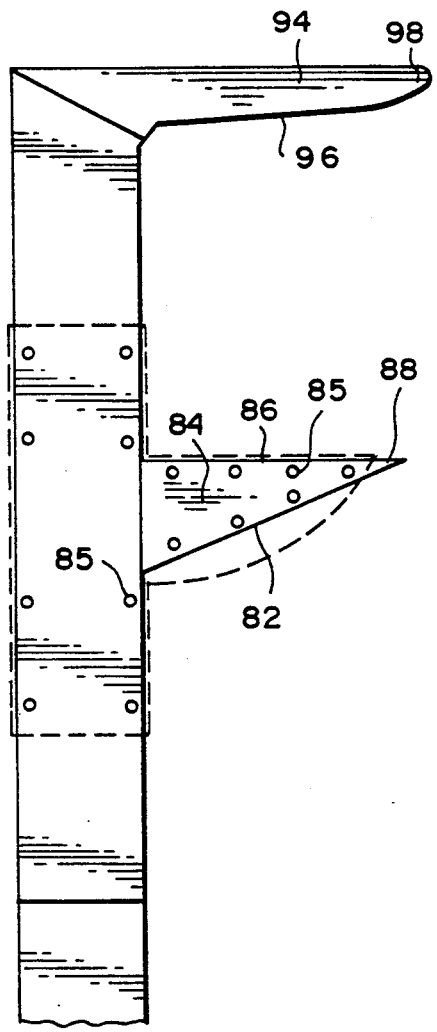
FIG. 6 is a perspective view of the cutter knife and wedge having a removable blade.
Figure 7:
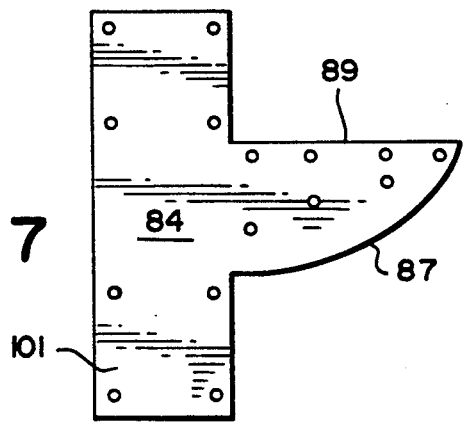
FIG. 7 is a perspective view of the removable blade.

The articulating arm 36 comprises a lever pivoted at point 72 to member 66 at its bottom end. The lever 36 has a tool 82 above the pivot point 72 and spaced a distance from a tool 94 at its very top. The tool 82 is in the form of a wedge member having a removable blade 84, FIGS. 6 and 7. The blade 84 has a curved bottom cutter edge 87 and a top cutter edge 89 integral with a shank 101. The cutter blade 84 is removably attached to the wedge 82 and arm 36 by fasteners 85. The wedge 82 has a top edge 86, a bottom edge 87, and an end point 88. It is seen that the tool or wedge 82 has its point 88 in close proximity, about one inch, to the grooves 40–44 in the base 38 when the machine is in the starting position, FIG. 2. The upper end of lever 36 is connected by a pivot 90 between a pair of spaced brackets 91 having their ends 93 (FIGS. 3, 4 and 6) rigidly connected to the base plate 38 such as by welding. The top end of the lever arm 36 has a cutting tool 94 thereon. The cutting tool 94 is rigidly and integrally connected to the top of the lever 36 and extends away at an angle as shown. The tool 94 is a knife-like member having an edge 96 terminating in a point 98. It is seen that the knife 94 is above the brackets 91 in the starting position and moves downwardly between the spaced brackets 91 during downward movement of the tool to cut an eye in an oyster shell having its edge placed between the knife 94 and the brackets 91.

The bottom 16 of the machine is a closed housing 100, FIG. 1, having a base platform 110 supported by wheels 112, one shown. Side 114 has a door, not shown, which permits access to the interior of the housing 100. As seen in FIG. 2, the interior 115 of the housing contains a compressor 116 having a copper air pipe 118 leading through a three-way check valve 120 to the inlet 126 of air tank 122. The outlet 128 from the air tank has a copper air pipe 130 attached to an air regulator 140. The air regulator 140 has a copper air pipe 144 intersecting a copper air pipe 146, the ends of which are attached to three-way valves 147 and 148. The copper air pipe 150 from valve 147 is attached to the inlet port 152 of pneumatic air cylinder 52. A copper air pipe 154 joins the other port 156 on the pneumatic air cylinder 52 to the valve 148. It will be understood that the air tank 122 is kept pressurized by the compressor 116 through a three-way check valve 120. An air filter 117 is provided as shown.

It will be understood that valve 147 is operated by a switch 190 which when pushed downwardly in the forward position operates switch 200 which allows pressurized air to enter port 152 to cause the piston 56 to move forwardly whereby the piston operates on the connecting arm 58, rod 62 and member 66 to articulate the arm 36 into a vertical position where the knife 94 is above the brackets 91. The switch 196 is then operated to allow air through valve 144 to enter port 156 whereby the piston 56 moves in the opposite direction to move lever 36 outwardly away from the wall 32. The operation brings the knife 94 downwardly against the oyster shell which is positioned between the knife 94 and the pair of brackets 91 to cut an eye in the end thereof.

When switch 196 is depressed, the knife blade moves downwardly against the oyster shell positioned behind the knife 94 and the brackets 91 to cut an eye in the oyster shell. The eye is then inserted into the wedge 82 and when switch 200 is depressed, valve 147 opens and air enters the cylinder 52 which brings the arm into a vertical position toward the base 38 and drives the wedge into the oyster shell against one of the grooves 40–44. The oyster shell is split by the force of the wedge 82 against the groove.

It will be understood that switch 200 is connected to valve 147 and switch 196 is connected to valve 148 by a suitable electrical wire 201, through a foundation box 202.

The pressure in the tank 122 is connected to air gauge 160 by a copper air pipe 162. Thus it will be understood that the pressure in tank 122 always shows on the air gauge 160. The tank 122 has a safety switch 180 which is set at 125 PSI in close proximity to the outlet line 130 and a pressure switch 182 is positioned near the top of the tank. This switch is set for 120 PSI. If the pressure goes above 125 PSI the safety switch 180 automatically opens and releases the excess air from the air tank 122. The pressure switch 182 controls the starting and stopping of the compressor and works off the pressure of the air tank 122 in a known manner. It cuts on when the air pressure in the air tank 122 drops to 90 PSI and runs continuously until the pressure builds up to 120 PSI and then cuts off.

The machine 10 and its cabinets may be of such small size as to be placed for operation on a table or the like. In this mode, there will be no wheels on the base.

In operation, the master switch 83 turns on the machine through a power line 85 attached to an electric source. This energizes pressure switch 182 and starts the compressor 116 in a known manner. Air is pulled in through the air filter 117 to the compressor, then through copper air pipe 118, through the three-way solenoid valve 120 into the air tank 122. This brings the pressure up to 120 PSI which is registered on the air gauge 160. Air comes out of outlet 128 and is fed through copper air pipe 130 into air regulator 140 from which it goes through copper air pipe 144 through copper air pipe 146 through a T which is the main air pipe which feeds valves 147 and 148. These valves, 147 and 148, cannot be energized simultaneously.

As the piston moves back and forth, the knife moves up and down cutting eyes in the oyster shell. Each movement down drives the wedge into the eye in the shell against the groove splitting the shell in half.

It will be understood that arm 36 moves as rapidly as the pedal is operated whereby shells may be shucked rapidly, efficiently, and safely.

While this invention has been described with regard to a preferred embodiment thereof, it will be understood to those skilled in the art to which the invention pertains that numerous changes may be made in the machine without departing from the spirit and scope thereof.

What I claim is:

1. A shellfish shucking machine comprising:
a housing having a front wall;
means on said front wall for supporting a shellfish;
a tool pivotally supported adjacent said front wall by pivot means, said tool having a cutter and a wedge disposed thereon in spaced apart relationship;
means for moving said tool toward and away from said shellfish whereby said cutter engages said shellfish to cut an opening therein and thereafter causes said wedge to engage the opening and split the shellfish against said shellfish supporting means;
said means for moving said tool includes a cylinder and piston rod, with said piston rod being pivotally connected to said tool pivot means for moving said tool with said cutter and wedge; and
actuating means operatively connected to said cylinder and piston rod controlling the same and for effecting the movement of said tool.

2. A shellfish shucking machine according to claim 1, wherein:
said housing includes a tray for catching oyster meat and liquid after opening of said shellfish.

3. A shellfish shucking machine according to claim 1, wherein:
said means on the front wall for supporting the oyster shell is a series of grooves of different size for supporting oyster shells of different size.

4. A shellfish shucking machine according to claim 1, wherein:
said housing is mobile.

5. A shellfish shucking machine according to claim 1, wherein:
said housing is supported on a table top.

6. A shellfish shucking machine according to claim 1, wherein:
said wedge has a removable cutting blade thereon.

* * * * *